(No Model.)
R. EINSTEIN.
PLUMB LEVEL.
No. 431,184.  Patented July 1, 1890.
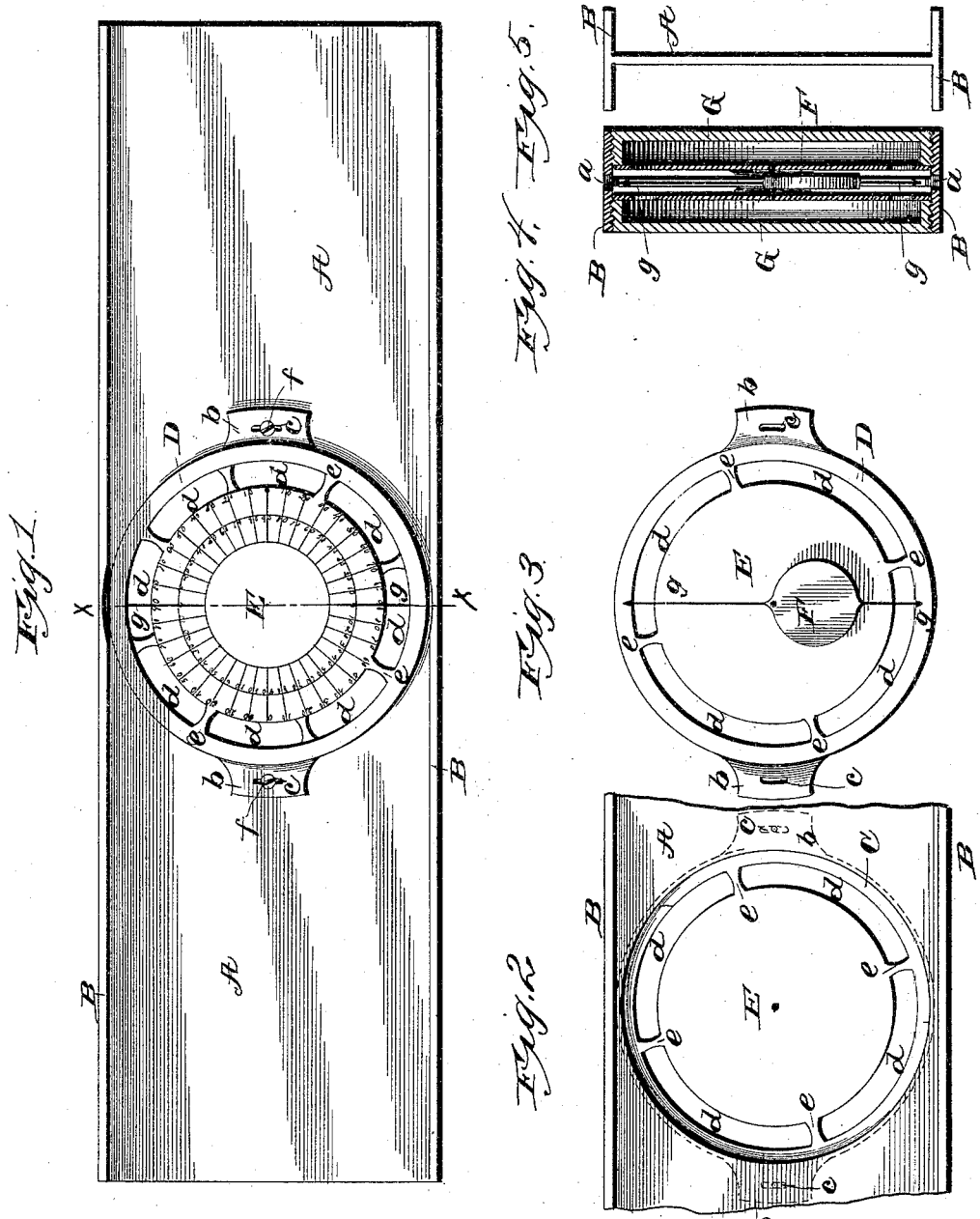
Witnesses,
Geo. G. Thorpi,
J. A. Tauberschmidt.
Inventor,
Reuben Einstein
by
Miles W. Bate,
Attorneys.

UNITED STATES PATENT OFFICE.

REUBEN EINSTEIN, OF MEADVILLE, PENNSYLVANIA.

PLUMB-LEVEL.

SPECIFICATION forming part of Letters Patent No. 431,184, dated July 1, 1890.

Application filed March 5, 1890. Serial No. 342,768. (No model.)

*To all whom it may concern:*

Be it known that I, REUBEN EINSTEIN, a citizen of the United States, residing at Meadville, in the county of Crawford and State of Pennsylvania, have invented certain new and useful Improvements in Gravity-Plumbs and Levels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in instruments which are used for the purpose of obtaining the level, plumb, or angle of any given object and can be adjusted to any instrument whereby the level, plumb, or angle is desired to be obtained.

The drawings and specification show and describe my invention when adjusted to a frame to be used by mechanics.

The invention will be hereinafter described, and particularly pointed out in the claims.

In the accompanying drawings, which form part of this specification, Figure 1 represents a side elevation of my invention applied to a stock to be used as a carpenter's level; Fig. 2, a similar view with one of the disks removed; Fig. 3, an inside view of the other disk, showing also a weighted indicator; Fig. 4, a vertical section on the line $x$ $x$, Fig. 1; and Fig. 5, an end view of the preferred form of stock employed when the device is to be used as a carpenter's level.

Reference being had to the drawings and the letters thereon, A indicates a stock made of any suitable material, preference being given to cast or rolled metal of sufficient thickness to insure durability, but at the same time as light as practicable. Stock A is made substantially I-shaped, with flanges B B, formed integral or otherwise secured thereto, and having through its center a circular opening extending from flange to flange B, designed for the reception of a weighted indicator, as will hereinafter appear.

The flanges B B are provided with longitudinal slots $a$ $a$ in their centers, of any suitable length, for the purpose of displaying the points of the indicator when the level is used in a horizontal position.

C D represent disks stamped from sheet metal, having at two points on their outer peripheries extensions or lugs $b$ $b$, provided with slots $c$ $c$, through which said disks are secured to stock A and which admit of an adjustment of the disks with relation to the stock and to each other.

Curved openings $d$ are cut in disks C and D for the purpose of displaying the indicator when viewed from the sides. These openings $d$, being four in number, have an equal number of radial arms or spokes $e$, which retain in position the central portions E, on the outer surfaces of which are stamped, embossed, or otherwise affixed a scale or scales representing three hundred and sixty degrees, or any fractional part thereof, said scales being arranged and numbered in any manner that experience dictates as most convenient for use in determining the level, plumb, or degree of inclination of any given object.

The disks C D are secured in position opposite each other over the opening in center of stock A, by bolts $f$ passing through openings $d$, in lugs $b$, and bolt-holes (not shown) in stock A and a weighted indicator is loosely journaled in the center of said disks, so as to revolve freely between same and in the opening through stock A. Indicator F is provided with two pintles $g$ $g$ above and below the weight.

It will be observed that the radial arms or spokes $e$ on disks C and D are not placed opposite each other, the arrangement of scales and the adjustment of the disks being such that the spokes of one disk are intermediate those of the other, so that if the indicator happens to settle behind a spoke on one side there will be nothing to obstruct the view from the opposite side if the instrument be reversed.

Owing to the peculiar configuration of stock A, it is obvious that the disks and indicator will be securely protected, for should the instrument meet with a blow or shock, occasioned by a fall or otherwise, the flanges B B will necessarily take the shock, owing to the fact that they extend beyond the surface of the stock. The indicator mechanism may be further protected by the use of two metallic caps G G for inclosing same when not in use. These caps being screw-threaded externally engage with the threads cut under the flanges B B in the center thereof; or said mechanism may be similarly protected by means of shutters (not shown) arranged to slide in grooves in the under side of flanges B B, thus exposing or incasing disks C D at the will of the operator.

The arrangement of parts being substantially as described, the operation is evident. If the instrument be used in a horizontal or vertical position, or nearly such, the indicator is viewed through openings in the disks. If above or below the person using it, the indicator may be viewed through slots *a a* in the flanges B B.

Having thus described my invention, what I claim is—

1. The combination of a plumb-level block, I-shaped in cross-section, having an aperture in the web thereof, scale-plates over the aperture provided with openings for displaying an indicator, and an overweighted indicator journaled between said plates, substantially as described.

2. The combination of a plumb-level block, I-shaped in cross-section, having an aperture in the web thereof, scale-plates secured over said aperture by slots in their margin and provided with openings for displaying an indicator, and an overweighted indicator journaled between the disks, substantially as described.

3. The combination of a plumb-level block, I-shaped in cross-section, having an aperture in the web thereof, scale-plates over the aperture provided with openings for displaying an indicator, openings in the top and bottom edges of the block for the same purpose, and an overweighted indicator journaled between said disks, substantially as described.

In testimony whereof I affix my signature in presence of two witnesses.

REUBEN EINSTEIN.

Witnesses:
EDWIN PERCY BROWN,
A. K. CARMICHAEL.